United States Patent
Roka et al.

(10) Patent No.: US 8,041,777 B2
(45) Date of Patent: *Oct. 18, 2011

(54) METHOD AND APPARATUS FOR DYNAMIC VARIATION OF CONTENT-DOWNLOAD DEPENDING ON FOREGROUND OR BACKGROUND NATURE OF DOWNLOAD

(75) Inventors: Pujan K. Roka, Olathe, KS (US); Kevin E. Hunter, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/776,907

(22) Filed: May 10, 2010

(65) Prior Publication Data

US 2010/0223352 A1 Sep. 2, 2010

Related U.S. Application Data

(63) Continuation of application No. 11/433,103, filed on May 12, 2006, now Pat. No. 7,756,946.

(51) Int. Cl.
*G06F 15/16* (2006.01)
(52) U.S. Cl. ......... 709/217; 709/219; 709/224; 709/238
(58) Field of Classification Search .......... 709/217–219, 709/223–224, 203, 238, 220
See application file for complete search history.

(56) References Cited

U.S. PATENT DOCUMENTS

| | | | |
|---|---|---|---|
| 6,170,016 B1 | 1/2001 | Nakai et al. | |
| 7,028,077 B2 * | 4/2006 | Toshimitsu et al. | 709/242 |
| 7,200,390 B1 * | 4/2007 | Henager et al. | 709/250 |
| 7,320,010 B2 * | 1/2008 | Peng | 709/217 |
| 7,465,231 B2 | 12/2008 | Lewin et al. | |
| 7,617,178 B2 * | 11/2009 | Chavez et al. | 709/223 |
| 7,756,946 B1 * | 7/2010 | Roka et al. | 709/217 |
| 7,779,027 B2 * | 8/2010 | James et al. | 707/769 |
| 2004/0204135 A1 | 10/2004 | Zhao et al. | |
| 2006/0136964 A1 | 6/2006 | Diez et al. | |

OTHER PUBLICATIONS

Notice of Allowability and accompanying papers from U.S. Appl. No. 11/433,103, mailed Mar. 9, 2010.

* cited by examiner

*Primary Examiner* — Philip B Tran

(57) ABSTRACT

A method is disclosed for dynamically varying a content download depending on whether the download is a foreground-download or a background-download. When a server receives a content-request from a device, the server determines whether the content-request is foreground-generated or background-generated and accordingly selects a set of content to transmit in response to the device. If the content-request is background-generated, for instance, the server may select a smaller quantity of content, since the device user might not be actively involved with the download. On the other hand, if the content-request is foreground-generated, the server may select a larger quantity of content, since the user is involved at the time. Alternatively, the device itself may select a location from which to request content, based on whether the download is a foreground-download or a background-download.

20 Claims, 4 Drawing Sheets

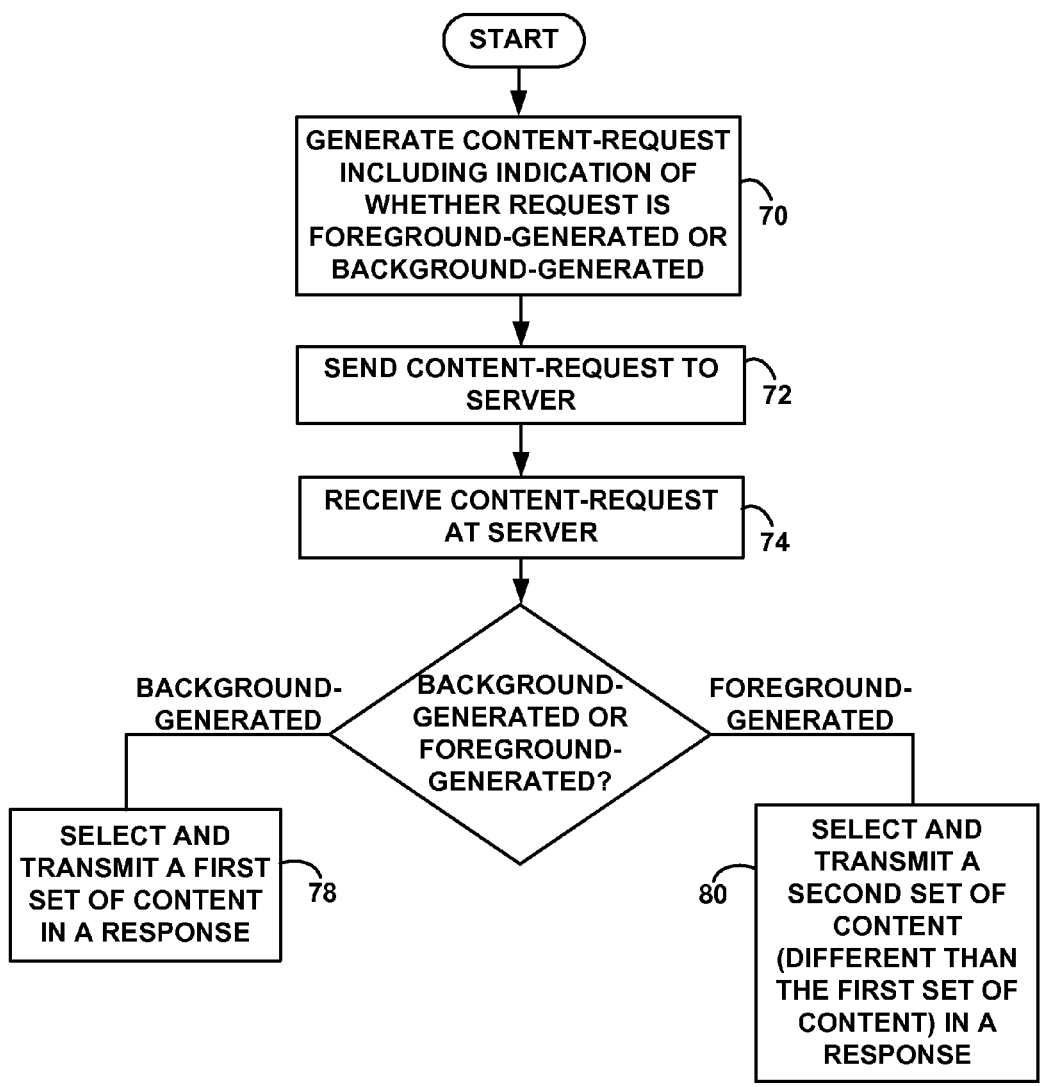

METHOD AND APPARATUS FOR DYNAMIC VARIATION OF CONTENT-DOWNLOAD DEPENDING ON FOREGROUND OR BACKGROUND NATURE OF DOWNLOAD

REFERENCE TO RELATED APPLICATION

This is a continuation of co-pending U.S. patent application Ser. No. 11/433,103, filed on May 12, 2006, the entirety of which is hereby incorporated by reference.

FIELD OF THE INVENTION

The present invention relates to network communications and, more particularly, to managing transmission of content to client devices. The invention is particularly useful in the context of wireless communications, although the invention can be applied in other network arrangements (e.g., landline networks) as well.

BACKGROUND

With the widespread growth of the Internet and advances in communication technology, users of communication devices can conveniently gain access to a virtually unlimited quantity of information and services. This is especially true with wireless communication devices, such as cell phones and wirelessly-equipped personal digital assistants for instance, which provide users with access to such information from virtually any location where wireless coverage exists.

As a general matter, a communication device may acquire content through either "background downloading" or "foreground downloading." Background downloading is a process by which the device downloads the content without user input at the time. For example, the device may be programmed to automatically download content at particular times, and the device may do so without prompting the user for approval and without receiving a user request or approval at the time to do so. As another example, the device may receive a content-notification message indicating that content is available to be downloaded, and the device may responsively download the content without prompting the user for approval and without receiving a user request or approval at the time to do so. (When the device conducts a background-download, the user may or may not perceive the device conducting the background-download. For instance, the device may or may not present a notice when it is conducting the background-download).

Foreground downloading, on the other hand, is a process by which the device downloads the content in response to user request or approval at the time. For example, a user may invoke a browser or other application on the device and thereby direct the device to download particular content at the time, and the device may responsively do so. As another example, the device may receive a content-notification message indicating that content is available to be downloaded, the device may responsively prompt the user for approval and receive user approval. In response to the user approval, the device may then download the content, as another instance of foreground downloading.

Both background and foreground downloading can be used, in combination or separately, to provide a versatile channel-presentation program on a communication device. Such a channel presentation-program, for instance, may allow a user to selectively view content of one or more channels (akin to TV channels), each of which may be focused on a particular subject (such as sports, weather, or pop-music, for instance). For each channel, the channel-presentation program may be arranged to periodically background-download the most current channel content from a designated URL. Alternatively, a network server may be arranged to periodically transmit the most current channel content to the device, as either a background-download or a foreground-download (e.g., with a content-notification message triggering the device to obtain user approval before downloading the designated content). Conveniently, whenever a user of the device then selects a desired channel in the channel-presentation program, the program can present the user with the latest set of content that was background-downloaded for that channel, without having to wait for the device to download the content.

Furthermore, through interaction with the channel-presentation program, the user may direct the program to update its content channels at the time through a foreground-download. For example, when the user first turns on the channel-presentation program, the user's initiation of the program may implicitly direct the program to update the content-channels at the time. As another example, the channel-presentation program may include an "update" function that the user can invoke in order to direct the program to update the content-channels. In response to such user requests, the channel-presentation program would thus initiate a foreground download of the latest channel content.

In order to conserve storage space and network resources, such a channel-presentation program may be arranged to download just a limited portion of each channel's content when conducting channel-updates, regardless of whether the updates are conducted through foreground or background downloading. For instance, the program may be arranged to send an HTTP request message to a URL that represents or points to such partial content. With this arrangement, when a user selects a particular channel, the program may then present the user with the just that downloaded portion of the channel's content, to conveniently give the user a flavor for the full channel content. If the user wishes to receive the full channel content, the user may then invoke a "full" function in the channel presentation program, which would direct the program to download the full channel content for presentation to the user. In particular, the program may download a full version of the content by sending an HTTP request message to a URL that represents or points to the full content.

For instance, the channel-presentation program may define a "news" channel that presents news stories, and the program may be set by default to download just a headline and first portion of each news story when performing a foreground or background channel update. When a user selects the news channel, the program may then present the user with a list of headlines, and the user may click on a desired headline to invoke presentation of the previously downloaded first portion of the corresponding story. After reading that first portion, if the user then wishes to view the full version of the story, the user may invoke a "full" function of the channel-presentation program to cause the program to download and present the full version of the story.

SUMMARY

The present inventors have recognized that a user is more likely to be interested in presentation of foreground-downloaded content than presentation of background-downloaded content, because a user is actively involved with the foreground-downloading process but is not actively involved with the background-downloading process. That is, given that a user invokes foreground-downloading (e.g., by requesting or approving the download at the time), it seems likely that the user would want to be presented with the downloaded content. On the other hand, when a device background-downloads content, the user may not even be aware that the download has occurred, and the user might not be interested in being presented with the particular downloaded content. Indeed, it is possible that numerous background-downloads of content (e.g., content updates) may occur over time without the user ever knowing that they occurred or being presented with the downloaded content.

To account for this disparity, the present invention provides for varying the set of content that is downloaded to a device, depending on whether the download is a foreground-download or a background-download. In a preferred embodiment, for instance, the quantity of content downloaded to the device can be made to vary depending on whether the content is downloaded in the foreground or in the background. In theory, since a user is actively involved with foreground-downloading, it would make sense to download more content to the device in a foreground-download than in a background-download, as the user is more likely to be presented with foreground-downloaded content than background-downloaded content.

Considering news-content for instance, if a device downloads news in the background, it would make sense for the device to download just partial news stories, since it is unclear whether a user would even request presentation of such downloaded content. On the other hand, if the device downloads the news in the foreground, it would make sense for the device to download full news stories, since the user is actively involved with the download at the time and is thus more likely to want to be presented with the downloaded content.

The invention is particularly beneficial in the context of wireless communications, where air interface resources and device battery power are often at a premium. In that context, the process of downloading content to a wireless communication device may consume air interface resources and battery power, and larger content downloads may consume a more resources. Thus, by downloading less content in a background-download than in a foreground-download, the background-download may consume less air interface resources and battery power than the foreground-download. On the other hand, when a foreground-download occurs, a user would be actively involved and theoretically more interested, so a greater consumption of air interface resources and battery power would likely be justified.

In accordance with an exemplary embodiment of the invention, to achieve this dynamic content selection based on the foreground or background nature of a download, a device requesting a download may include in its download-request an indication of whether the download-request is foreground-generated (i.e., provided as a foreground-download request) or background-generated (i.e., provided as a background-download request). The server or other network entity that receives the download-request may then determine based on the provided indication whether the download is a foreground-download or a background-download.

If the server thereby determines that the download is a background-download, then the server may transmit a given set of content in response to the device. On the other hand, if the server thereby determines that the download is a foreground-download, then the server may transmit a different set of content in response to the device. Preferably, but not necessarily, the set of content that the server would transmit to the device for a foreground-download would be a greater quantity of content than the server would transmit to the device for a background-download. Further, the content that the server would transmit to the device for a foreground-download may include the content that the server would transmit to the device in for background-download plus additional content. (For instance, the server may send partial news stories in the background-download scenario but full news stories in the foreground-download scenario.)

To accomplish this in practice, the server may have two different sets of content stored and ready to deliver in response to a given download request, a first set for responding to a background-download request and a second set for responding to a foreground-download request. The server may associate both sets of content with a common network address, such as a common URL (e.g., a common base-URL). Thus, the device may send the download-request to that network address, providing in the request the indication of whether the request is background-generated or foreground-generated. For instance, the device may indicate the foreground or background nature of the request by providing an indicator as a URL query parameter or HTTP header parameter. Upon receipt of the request, the server may then select the corresponding one of the sets of content to deliver to the device depending on whether the request is background-generated or foreground-generated.

These as well as other aspects, advantages, and alternatives will become apparent to those of ordinary skill in the art by reading the following detailed description, with reference where appropriate to the accompanying drawings. It should be understood, of course, that this summary and other description provided below is set forth for purposes of example only, and that numerous variations are possible, within the scope of the claimed invention.

BRIEF DESCRIPTION OF THE DRAWINGS

FIG. 4 is a flow chart depicting functions that can be carried out in accordance with the exemplary embodiment.

DETAILED DESCRIPTION

1. Overview

Figure 1:
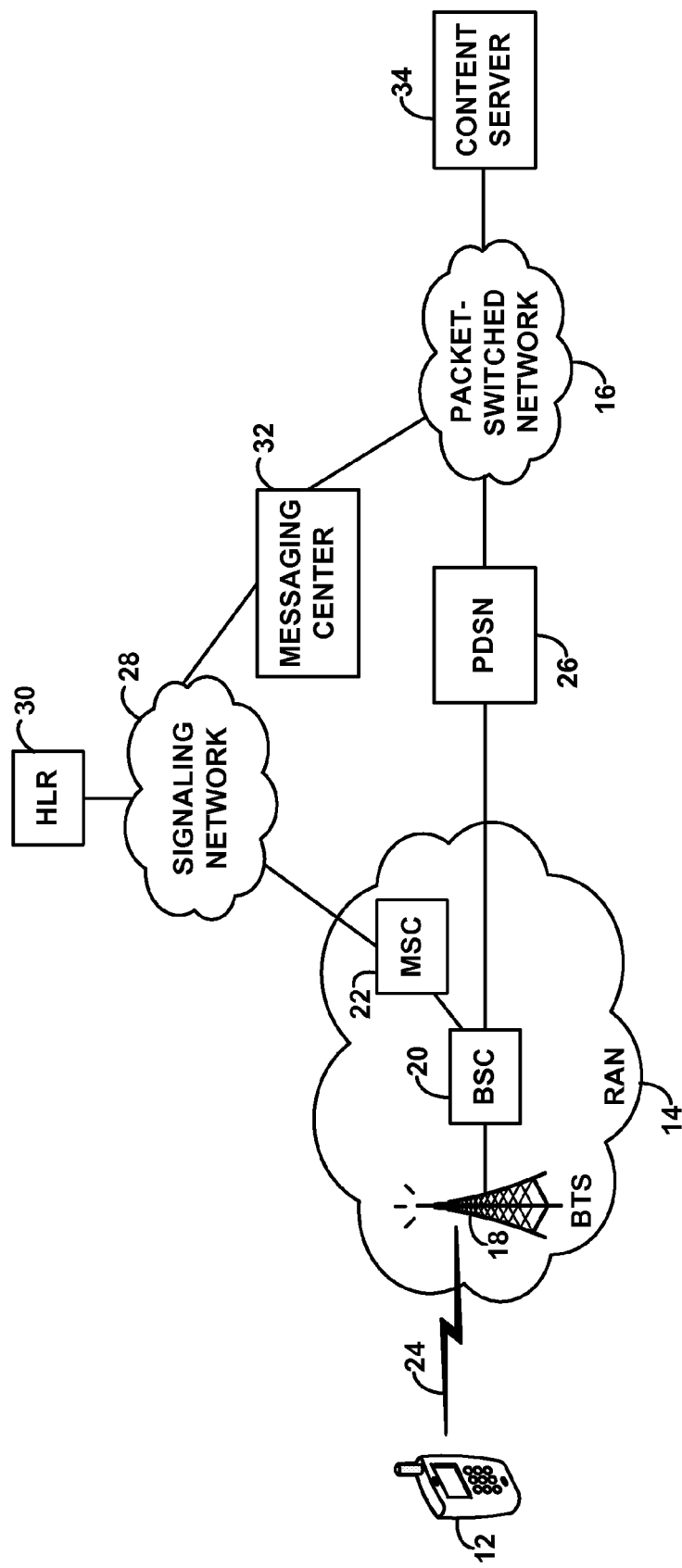
FIG. 1 is a simplified block diagram of a network in which an exemplary embodiment of the invention can be implemented.

In one respect, an exemplary embodiment of the invention may take the form of method of varying the quantity of content downloaded to a communication device, depending on the foreground or background nature of the download. Such a method may involve (i) receiving into a network entity a content-request transmitted over a network from a communication device, where the content-request seeks particular content, (ii) making a determination at the network entity whether the content-request is foreground-generated or background-generated, (iii) if the determination is that the content-request is background-generated, then transmitting a first quantity of the particular content in response to the communication device, and (iv) if the determination is that the content-request is foreground-generated, then transmitting a second quantity of the particular content in response to the communication device, the second quantity being greater than the first quantity.

In this method, the second quantity of the particular content may include the first quantity of the particular content, plus additional content. Further, the communication device may be a cellular wireless communication device or other device and may be programmed with a channel-presentation program. In that case, the particular content may comprise channel-content for presentation by the channel-presentation program, and the program may send the content-request as an HTTP request specifying the background or foreground nature of the request in a URL query parameter or HTTP header, or in some other manner. Thus, the network entity may determine whether the content-request is foreground-generated or background-generated by reading an indication from the HTTP request.

In another respect, the method may involve (i) receiving into a network entity a content-request transmitted over a network from a communication device to the network entity, where the content-request carries an indication of whether the content-request is foreground-generated or background-generated, and then (ii) the network entity using the indication as a basis to select a set of content to transmit in response to the communication device. Further, the method may involve the network entity then transmitting the selected set of content in response to the communication device.

In this method, the content-request preferably seeks particular content (such as particular subject matter associated with a URL specified in the request). In that case, using the indication as a basis to select the set of content to transmit in response from the network entity to the communication device may involve (a) selecting as the set of content a first quantity of the particular content if the indication is that the content-request is background-generated or (b) selecting as the set of content a second quantity of the particular content if the indication is that the content-request is foreground-generated, where the second quantity is greater than the first quantity. Similarly, the act of selecting the set of content may involve selecting a first set of content if the indication is that the content-request is background-generated or (b) selecting a second set of content if the indication is that the content-request is foreground-generated, where the second set of content includes both the first set of content and additional content.

Furthermore, in this method as well, the communication device may comprise a cellular wireless communication device, such as a cell phone or wirelessly-equipped personal digital assistant for instance, and device may be programmed with a content-presentation application. Thus, the set of content may comprise channel-content for presentation by the content-presentation application for instance.

In addition, the exemplary method may involve the communication device generating the content-request, including the indication, and then transmitting the generated content-request over the network from the communication device to the network entity. In that process, the act of generating the content-request, including the indication, may take various forms.

For example, if the device generates the content-request in response to a current request by a user (e.g., a request or approval by the user at the time), then the device may include the content-request an indication that the content-request is foreground generated. On the other hand, if the device generates the content-request automatically, rather than in response to a current user request, then the device may include in the content-request an indication that the content-request is background-generated.

As another example, if the device generates the content-request in response to a current request by a user to receive a more full version of previously received content (e.g., a full version of a news story only partially downloaded before), then the device may include in the content-request an indication that the content-request is foreground generated. On the other hand, if the device generates the content-request automatically pursuant to a predefined schedule, then the device may include in the content-request an indication that the content-request is background-generated.

And as yet another example, if the device receives a content-notification message, responsively presents a prompt for user-approval of content-downloading, receives the user-approval, and responsively generates the content-request, then the device may include in the content-request an indication that the content-request is foreground-generated. On the other hand, if the device automatically generates the content-request without current user input, then the device may include in the content-request an indication that the content-request is background-generated.

The content-request itself may take any desired form. As discussed above, for example, the content request may be an HTTP request. In that case, the device may indicate the foreground or background nature of the content-request as a URL query parameter or an HTTP header parameter, or in some other manner. The content request and indication can also take other form as well.

2. Example Architecture

As noted above, the invention can be applied in various types of communication systems but is especially useful in cellular wireless communications. Accordingly, an exemplary embodiment of the invention will be illustrated and described in terms of a cellular wireless communication system, with the understanding that the concepts described here can be readily applied in other scenarios as well.

FIG. 1 is a simplified block diagram of telecommunications network in which the exemplary embodiment can be implemented. It should be understood, of course, that this and other arrangements and functions described herein are provided by way of example only and that numerous variations may be possible. For instance, elements can be added, omitted, combined, distributed, reordered, repositioned, or otherwise changed while remaining within the scope of the invention as defined by the claims. Further, it should be understood that various functions described herein can be carried out by hardware, firmware, and/or software (e.g., one or more processors programmed with machine language instructions to carry out the functions).

FIG. 1 depicts a wireless communication device 12 served by a radio access network (RAN) 14 that provides connectivity with a packet-switched network 16. RAN 16 is shown by way of example including a base transceiver station (BTS) 18, a base station controller (BSC) 20, and a mobile switching center (MSC) 22. BTS 22 radiates to define one or more wireless coverage areas in which device 12 can communicate with the BTS 18 over an air interface 24, according to any agreed air-interface protocol (examples of which include CDMA, GSM, and TDMA). BTS 18 is then coupled with BSC 20, which manages aspects of communications over air interface 24. BSC 20 is in turn coupled with MSC 22, which provides connectivity with the public switched telephone network (PSTN) (not shown), and BSC 20 is further coupled with a packet data serving node (PDSN) 26, which provides connectivity with the packet-switched network 16.

RAN 14 and other components of FIG. 1 are preferably arranged to support wireless packet-data communications, so that devices 12 can communicate with entities on packet-switched network 16. In an exemplary system, device 12 may acquire wireless packet-data connectivity by first transmitting a packet-data origination-request over an air interface access channel to the RAN 14. Upon receipt of the request, BSC 20 may then establish a radio link layer connection with the device 12 and may signal to PDSN 26 to facilitate establishment of a packet-data connection, and PDSN 26 may set up a data link layer connection (e.g., point-to-point protocol (PPP) session) with the device. Further, the PDSN or a Mobile-IP home agent (not shown) may then assign an IP address to the device, so the device can then engage in IP communications on network 16 via its radio link and data link layer connections. Other procedures for establishing and using a wireless packet-data connection are possible as well, depending on the air interface protocol used, for instance.

As further shown in FIG. 1, MSC 22 (or more generally RAN 14) is coupled with a signaling network 28, such as a Signaling System #7 (SS7) network, for instance. Signaling network 28 facilitates signaling communication between the RAN 14 and various other entities, such as a home location register (HLR) 30 and a messaging service center 32. These entities may take various forms.

HLR 30 functions in a well known manner to maintain wireless-device service profiles and to deliver a copy of a device's service profile to the MSC that is currently serving the device. Typically, HLR 30 also maintains a record of the last known location of each wireless device, such as the cell, cell sector, or MSC serving-area where the device last registered for service, for instance, so HLR 30 can function to route messages to the MSC serving a destination wireless device.

Messaging center 32 preferably comprises a short messaging service center (SMSC), arranged in a well known manner to facilitate transmission of text or other short messages to wireless devices according to the Short Messaging Service (SMS), as defined by industry standard IS-637-A and IS-41-D, for instance. As further shown, messaging center 30 preferably also sits as a node on packet-switched network 16, so that messaging center 30 can receive messages that are being transmitted from other entities on the network 16 to wireless devices served by RAN 14.

In practice, an entity on network 16 may use SMS messaging to trigger a download-request by a wireless device such as device 12. In particular, the entity may send a content-notification message (e.g., a "WAP Push message") to the device, by transmitting the content-notification message via a gateway (not shown) to the messaging center 32. The messaging center 32 would then send the content-notification message as an SMS message (e.g., an industry standard SMDPP message) to the MSC that is currently serving the device (as determined by querying the HLR), to facilitate transmission of the content-notification message over the air to the device.

Such a content-notification message would typically carry with it a URL that points to the content to be downloaded, as well as a special code that triggers application logic on the device to download content from the URL. Thus, upon receipt of the content-notification message, the device may automatically acquire packet-data connectivity if it does not have it already, and the device may then automatically send an HTTP request message seeking content from the designated URL. Further, the application logic may or may not be arranged to prompt a user for approval before sending an HTTP content-request in response to such a content-notification message. Thus, the content-request in such a scenario may be a foreground-generated request (if the user provides approval at the time) or a background-generated request (if the device generates the request without user involvement at the time).

Shown sitting as another node on packet-switched network 16 is a content server 34, which functions to send content to communication devices, such as to wireless device 12 for instance. Pursuant to the exemplary embodiment, content server 34 additionally functions to receive a content-request from device 12, to determine whether the content-request is foreground-generated or background-generated, and to select (e.g., generate, pick, or obtain) a set of content depending on whether the content-request is foreground-generated or background-generated. The content server 34 then functions to transmit the selected set of content in response to the device 12.

Figure 2:
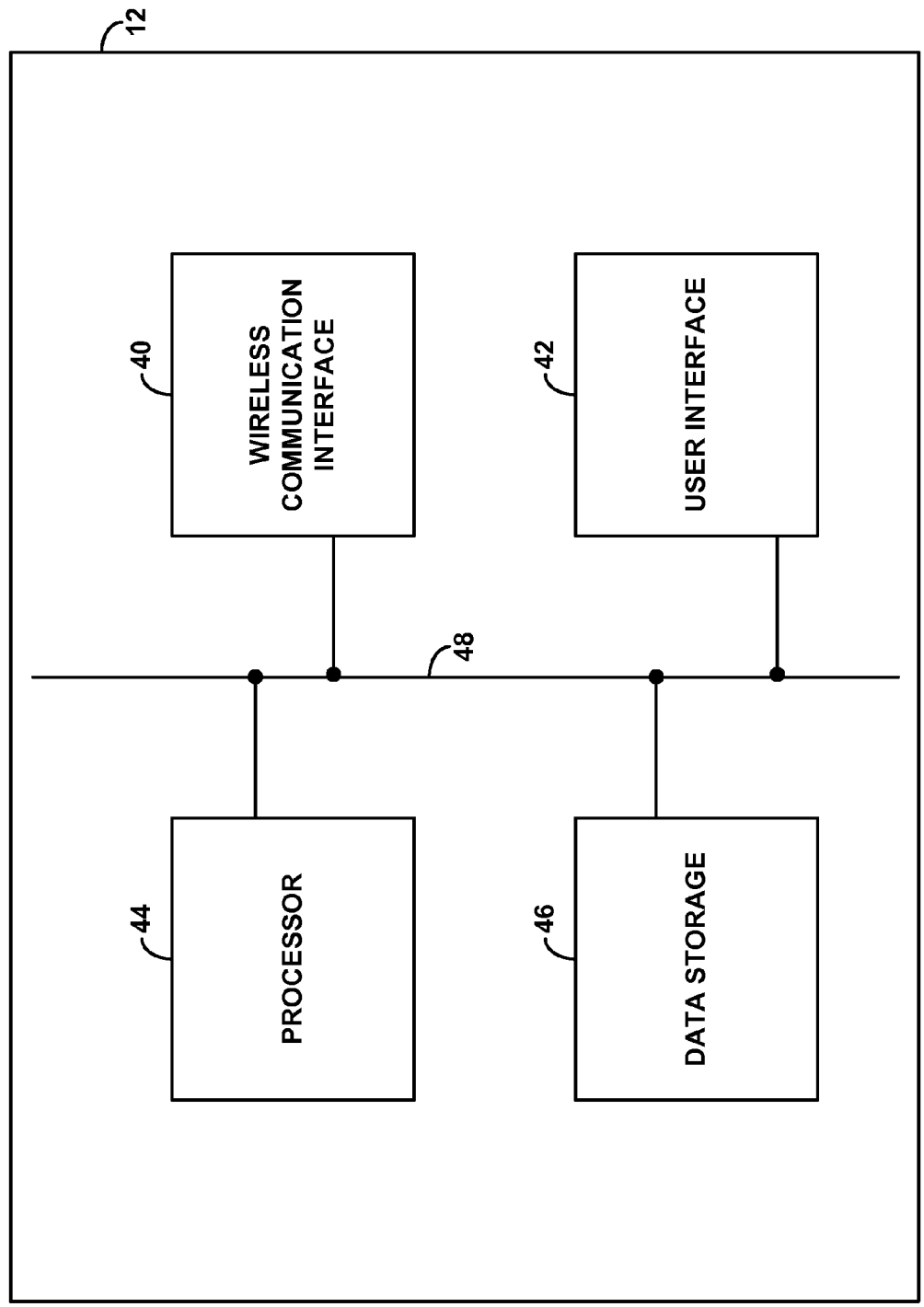
FIG. 2 is a simplified block diagram of a communication device operable within the exemplary embodiment.

FIG. 2 is a simplified block diagram of wireless device 12, depicting various components that can be included in the device in accordance with the exemplary embodiment. As shown, the exemplary wireless device 12 includes a wireless communication interface 40, a user interface 42, a processor 44, and data storage 46, all of which may be coupled together by a system bus, network, or other mechanism 48.

Wireless communication interface 40 may comprise a chipset and antenna arranged to facilitate wireless communication with RAN 14 according to an agreed air-interface protocol (including any now known or later developed). Exemplary chipsets include the well known "MSM" series of chipsets available from Qualcomm Incorporated. User interface 42, in turn, comprises input/output components, such as a display, a speaker, a keypad, and a microphone, for presenting content and other information to a user and for receiving input from a user.

Processor 44 may comprise one or more general purpose processors (e.g., INTEL microprocessors) and/or one or more special purpose processors (e.g., digital signal processors). Data storage 46, in turn, may comprise one or more volatile and/or nonvolatile storage components such as magnetic, optical, or organic storage, and may be integrated in whole or in part with processor 46.

Data storage 46 is preferably arranged to hold downloaded-content, which can comprise audio, video, images, graphics, text, and/or any other type of content now known or later developed. Further, data storage 46 preferably contains program instructions (e.g., machine language instructions) executable by processor 44 to carry out various functions described herein. For example, the program instructions may define logic for acquiring wireless packet-data connectivity and engaging in wireless packet-data communication. As another example, the program instructions may define logic for conducting foreground and background downloads (as part of a channel-presentation program for instance), including logic for generating and sending content-requests (e.g., HTTP requests or other sorts of content-requests) and receiving and presenting content. Still further, in accordance with the exemplary embodiment, the program instructions preferably define logic for including in each content-request an indication of whether the request is foreground-generated or background-generated.

Figure 3:
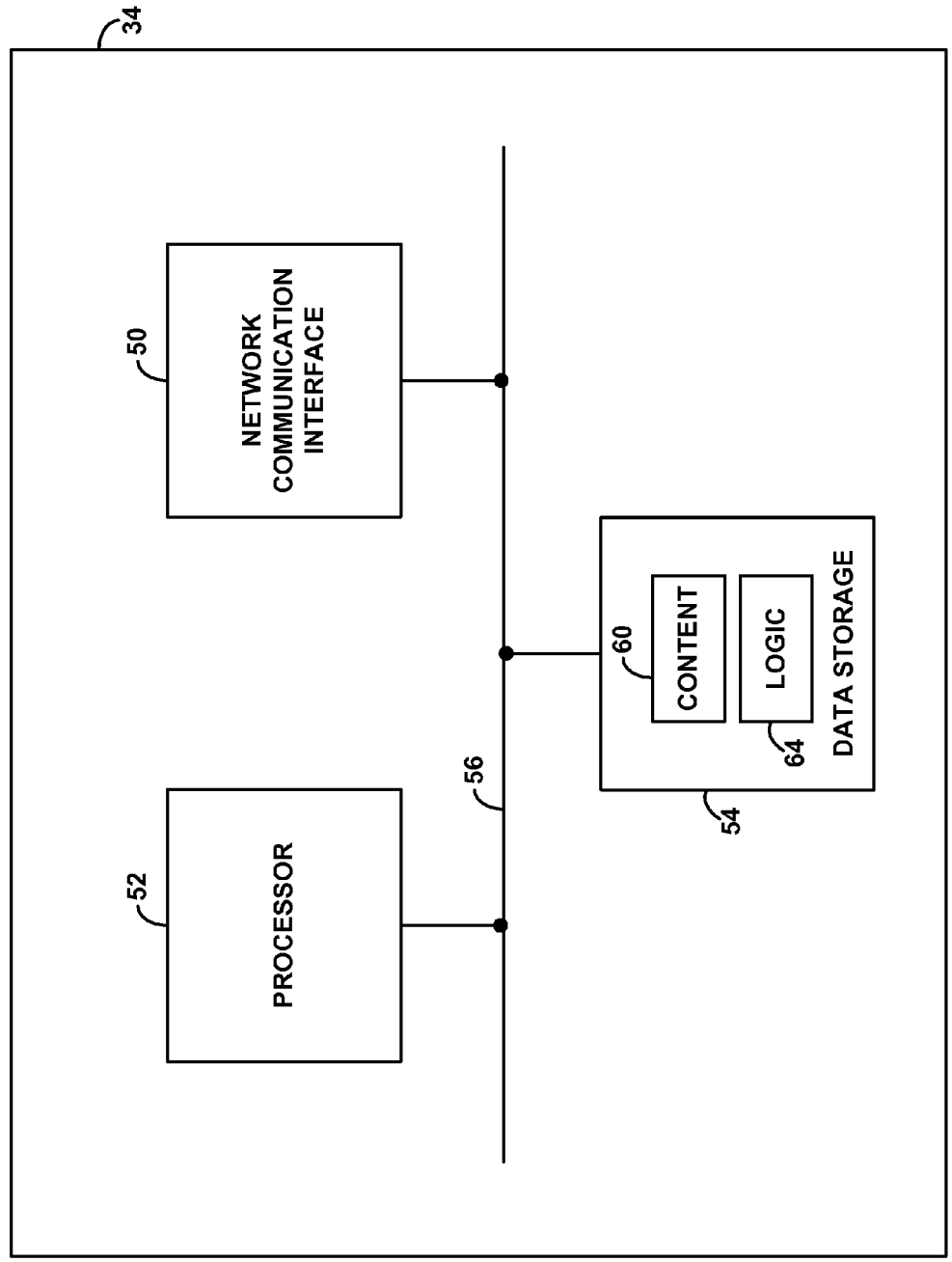
FIG. 3 is a simplified block diagram of a content server operable within the exemplary embodiment.

FIG. 3 is next a simplified block diagram of server 34, depicting various components that can be included in the server in accordance with the exemplary embodiment. As shown, the exemplary server includes a network communication interface 50, a processor 52, and data storage 54, all of which may be coupled together by a system bus, network, or other mechanism 56.

Network communication interface 50 functions to connect server 34 with packet-switched network 16 so that server 34 can engage in packet-data communication over the network 16. As such, network communication interface 50 may comprise an Ethernet network interface card, a wireless network interface module (e.g., an IEEE 802.11 interface), and/or any other network interface now known or later developed.

Processor 52 may comprise one or more general purpose processors (e.g., INTEL microprocessors) and/or dedicated processors (e.g., digital signal processors). Data storage 54, in turn, may comprise one or more magnetic, optical, organic, or other storage components, whether volatile or non-volatile, and may be integrated in whole or in part with processor 52. As shown, data storage 54 preferably holds or is arranged to hold content 60 and program logic 64.

Content 60 comprises content that server 34 may transmit to communication devices such as device 12. Although not shown in FIG. 1, server 34 will likely obtain this content from one or more content sources on packet-switched network 16. The content sources may provide various content that may be updated from time to time, such as news, weather, stock reports, sports scores, and the like. Thus, the content 60 in data storage 54 of server 34 may vary and be updated over time, through communication between server 34 and the various content sources. This content may be stored by server 34 in the form of one or more XML files, such as HTML documents for instance, or in any other manner now known or later developed.

Server 34 may host a number of URLs (or other content identifiers), each associated with respective a content category. For instance, one URL may be for news, another URL may be for weather, another URL may be for stocks, and another URL may be for sports. Thus, a device such as device 12 may request particular content (e.g., a content-update) from server 34 by sending an HTTP request to the respective URL.

In accordance with the exemplary embodiment, server 34 may maintain in data storage 54 at least two different sets of content associated respectively with each URL. For instance, one set of content may be a relatively small quantity of content, and another set of content may be a relatively large quantity of content. Alternatively or additionally, the sets of content may differ from each other in ways other than quantity. For instance, they may differ from each other in terms of subject matter. Still alternatively, rather than maintaining two or more discrete sets of content for a given URL, server 34 may maintain just one set of content for a URL and may further maintain a pointer that designates a subset of the one set of content (e.g., a break point in the set). That way, the subset can be considered a first set of content for the URL, and the full set can be considered a second set of content for the URL. Other ways to define two or more sets of content for a given URL can be devised as well.

Logic 64, in turn, comprises program logic (e.g., machine language instructions) executable by processor 52 to carry out various functions described herein. For instance, the program logic may be executable by processor 52 to receive from device 12 a content-request, such as an HTTP request seeking content from a particular URL, and to deliver the requested content in an HTTP response to the device.

Further, in accordance with the exemplary embodiment, the program logic is preferably executable, upon receipt of a content-request, to determine whether the content-request is foreground-generated or background-generated and to accordingly select a set of content to deliver in response to the device. In particular, the program logic may cause processor to read from the content-request (e.g., from URL query parameter or HTTP header) an indication of whether the content-request is foreground-generated or background-generated. If the content-request is foreground-generated, then logic may then cause the processor to select one of the sets of content associated with the URL, whereas, if the content-request is background-generated, then the logic may cause the processor to select another one of the sets of content associated with the URL. Other procedures for the server to determine whether a content-request is foreground-generated or background-generated may be devised as well.

3. Example Operation

Referring next to FIG. 4, a flow chart is provided, to summarize some of the functions that can be carried out in accordance with the exemplary embodiment. As shown in FIG. 4, at step 70, device 12 generates a content-request, including in the request an indication of whether the content-request is foreground-generated or background-generated. As explained above, for instance, device 12 may generate the request as an HTTP request and may include the indication as a URL query parameter or an HTTP header parameter (e.g., as a predefined string, numeric code, or any other value that the device and server 34 are programmed to understand as the indication.) Examples of scenarios in which the device would indicate that the request is foreground-generated or background-generated are discussed above.

At step 72, device 12 transmits the content-request over a network to server 34. At step 74, server 34 thus receives the content-request transmitted from device 12. And at step 76, server 34 determines whether the content-request is foreground-generated or background-generated. For instance, server 34 may read the indication provided in the request by device 12 to make this determination.

If server 34 thereby determines that the content-request is background-generated, then, at step 78, server 34 may then select a first set of content and transmit the first set of content in response to device 12. On the other hand, if server 34 thereby determines that the content-request is foreground-generated, then, at step 80, server 34 may select a second, different, set of content and transmit the second set of content in response to device 12. As noted above, the second set of content may be a greater quantity of content than the first set of content and may, for instance, include the first set of content plus additional content.

4. Alternative: Selection by Device

In an alternative embodiment, rather than having the server select a set of content to deliver to the device based on a determination of whether the content-request is foreground-generated or background-generated, the device itself can be programmed with logic to select content to download based on that determination. For example, the device may be programmed to request content from a first URL (or more generally a first location, such as first network server, first URL, and/or other first location) if the download is a background-download but to request content from a second URL (or more generally a second location) if the download is a foreground-download.

Considering the news-channel scenario discussed above for instance, when the device conducts a background-download to update a news-channel, the device may programmatically send an HTTP request to a URL that points to partial news story content. On the other hand, when the device conducts a foreground-download to update the news-channel (e.g., in response to a user request at the time to update the channel), the device may programmatically send an HTTP request to a URL that points to the full news story content. A channel-presentation program on the device can be provisioned with these two different URLs to use and with logic to select one to use depending on whether the download is a background-download or a foreground-download.

5. Conclusion

An exemplary embodiment has been described above. It should be understood, however, that variations from the embodiment discussed are possible, while remaining within the true spirit and scope of the invention as claimed.

We claim:

1. A method comprising:
   receiving into a network entity a content-request transmitted over a network from a communication device to the network entity, the content-request carrying an indication of whether the content-request is foreground-generated or background-generated;
   using the indication as a basis to select a set of content to transmit from the network entity to the communication device in response to the content-request, and
   transmitting the selected set of content to the communication device in response to the content-request.

2. The method of claim 1, wherein using the indication as a basis to select the set of content to transmit in response from the network entity to the communication device comprises:
   if the indication is that the content-request is background-generated, selecting a first set of content;
   if the indication is that the content-request is foreground-generated, selecting a second set of content that includes both the first set of content and additional content.

3. The method of claim 1, wherein the communication device comprises a cellular wireless communication device.

4. The method of claim 3, wherein the cellular wireless communication device is programmed with a content-presentation application, and wherein the set of content comprises channel-content for presentation by the content-presentation application.

5. The method of claim 1, further comprising:
   generating the content-request, including the indication, at the communication device; and
   transmitting the generated content-request over the network from the communication device to the network entity.

6. The method of claim 5, wherein generating the content-request, including the indication, comprises:
   if the content-request is generated in response to a current request by a user, then generating the content-request including as the indication an indication that the content-request is foreground-generated; and
   if the content-request is generated automatically by the communication device, rather than in response to a current request by a user, then generating the content request including as the indication an indication that the content-request is background-generated.

7. The method of claim 5, wherein generating the content-request, including the indication, comprises:
   if the content-request is generated in response to a current request by a user to receive a more full version of previously received content, then generating the content-request including as the indication an indication that the content-request is foreground downloaded; and
   if the content-request is generated automatically by the communication device pursuant to a predefined schedule, then generating the content-request including as the indication an indication that the content-request is background-generated.

8. The method of claim 5, wherein generating the content-request, including the indication, comprises:
   if the communication device receives a content-notification message, responsively presents a prompt for user-approval of content-downloading, receives the user-approval, and responsively generates the content-request, then including as the indication an indication that the content-request is foreground-generated; and
   if the communication device automatically generates the content-request without current user input, then including as the indication an indication that the content-request is background-generated.

9. The method of claim 8, wherein the communication device comprises a cellular wireless communication device, and wherein the content-notification message is sent via Short Messaging Service (SMS) messaging.

10. The method of claim 1, wherein the content-request comprises an HTTP request directed to a URL.

11. The method of claim 10, wherein the HTTP request carries the indication as a parameter selected from the group consisting of (i) a URL query parameter and (ii) an HTTP header parameter.

12. A server comprising:
    a network communication interface;
    a processor;
    data storage; and
    program logic stored in the data storage and executable by the processor to receive from a device a request for content and to deliver the requested content to the device, wherein the request includes an indication of whether the request is foreground-generated or background-generated,
    the program logic being executable to make a determination, based on the indication, of whether the request is foreground-generated or background generated and, (i) if the determination is that the request is foreground-generated, then to select a first set of content as the content to deliver to the device in response to the request, and (ii) if the determination is that the request is background-generated, then to select a second set of content as the content to deliver to the device in response to the request.

13. The server of claim 12,
    wherein the request designates the content by a content-identifier, and
    wherein the server stores in the data storage at least (i) the first set of content in association with the content-identifier and (ii) the second set of content in association with the content-identifier.

14. The server of claim 12, wherein the data storage stores the content, wherein the server maintains a pointer pointing to a breakpoint in the stored content defining a subset of the content, and wherein the first set of content is the subset of content and wherein the second set of content is the content as a whole.

15. The server of claim 12, wherein the indication is provided in a query parameter of the request.

16. The server of claim 12, wherein the indication is provided in a header of the request.

17. The server of claim 12, wherein the first set of content and second set of content differ from each other in terms of content quantity, the second set of content defining less content than the first set of content.

18. The server of claim 12, wherein the first set of content and second set of content differ from each other in terms of subject matter.

19. A method comprising:
    receiving into a network entity a content-request transmitted over a network from a communication device to the network entity, the content-request carrying an indication of whether the content-request is foreground-generated or background-generated; and
    using the indication as a basis to select a set of content to transmit from the network entity to the communication device in response to the content-request,
    wherein using the indication as a basis to select the set of content to transmit in response from the network entity to the communication device comprises: (i) if the indication is that the content-request is background-generated, selecting a first set of content and (ii) if the indication is that the content-request is foreground-generated, selecting a second set of content that includes both the first set of content and additional content.

20. A server comprising:

a network communication interface;

a processor;

data storage; and program logic stored in the data storage and executable by the processor to receive from a device a request for content and to deliver the requested content to the device, the program logic being executable to make a determination of whether the request is foreground-generated or background generated and, (i) if the determination is that the request is foreground-generated, then to select a first set of content as the content to deliver to the device in response to the request, and (ii) if the determination is that the request is background-generated, then to select a second set of content as the content to deliver to the device in response to the request, wherein the first set of content and second set of content differ from each other in terms of content quantity, the second set of content defining less content than the first set of content.

* * * * *